(12) United States Patent
Saygivar et al.

(10) Patent No.: US 11,083,917 B2
(45) Date of Patent: Aug. 10, 2021

(54) PROTECTIVE DEVICE TO PREVENT PERSONS FROM FALLING

(71) Applicants: Fiona Gabriella Saygivar, Rostrevor (GB); Sharon Naomi Saygivar, Rostrevor (GB); Lisa Marie Saygivar, Rostrevor (GB)

(72) Inventors: Fiona Gabriella Saygivar, Rostrevor (GB); Sharon Naomi Saygivar, Rostrevor (GB); Lisa Marie Saygivar, Rostrevor (GB)

( * ) Notice: Subject to any disclaimer, the term of this patent is extended or adjusted under 35 U.S.C. 154(b) by 31 days.

(21) Appl. No.: 16/342,222

(22) PCT Filed: Oct. 16, 2017

(86) PCT No.: PCT/EP2017/001216
§ 371 (c)(1),
(2) Date: Apr. 16, 2019

(87) PCT Pub. No.: WO2018/072873
PCT Pub. Date: Apr. 26, 2018

(65) Prior Publication Data
US 2019/0240515 A1    Aug. 8, 2019

(30) Foreign Application Priority Data
Oct. 17, 2016 (DE) ..................... 10 2016 012 321.4

(51) Int. Cl.
*E04G 21/32* (2006.01)
*A62B 35/04* (2006.01)
(Continued)

(52) U.S. Cl.
CPC .......... *A62B 35/04* (2013.01); *A62B 35/0068* (2013.01); *E04G 21/3204* (2013.01);
(Continued)

(58) Field of Classification Search
CPC . A62B 35/04; A62B 35/0068; E04G 21/3204; E04G 21/3276; F16M 11/046;
(Continued)

(56) References Cited

U.S. PATENT DOCUMENTS 2,383,172 A  *  8/1945  Wagner .................. B66C 23/36
                                                            212/300
5,076,448 A  *  12/1991  Ballard .................. B66C 23/48
                                                            212/294

(Continued)

*Primary Examiner* — Nkeisha Smith
(74) *Attorney, Agent, or Firm* — Laurence A. Greenberg; Werner H. Stemer; Ralph E. Locher (57) ABSTRACT

A protective device to prevent persons from falling has a base and an anchor mast system in connection with the base. On a free upper end of the anchor mast system, personal protective equipment (PPE) is fastened at an anchor point. To increase stability, the anchor mast system is provided with a lower standing section and a cantilever section. The standing section and the cantilever section are pivoted by a pivot drive relative to each other and relative to the base such that the anchor point in connection with the PPE is displaced downwards and away from the tilting edge of the base. This reduces the total height of the protective device, and increases the stability in the event of load in the region of the anchor point, while the weight of the protective device, particular also of the base, is reduced.

9 Claims, 9 Drawing Sheets (51) Int. Cl.
*F16M 11/04* (2006.01)
*A62B 35/00* (2006.01)

(52) U.S. Cl.
CPC ....... *E04G 21/3276* (2013.01); *F16M 11/046* (2013.01); *F16M 11/048* (2013.01); *F16M 2200/041* (2013.01); *F16M 2200/063* (2013.01)

(58) Field of Classification Search
CPC ...... F16M 11/048; F16M 11/42; F16M 11/38; F16M 2200/041; F16M 2200/063; F16M 2200/06; E06C 5/04; E06C 5/06; B65G 17/066
See application file for complete search history.

(56) References Cited

U.S. PATENT DOCUMENTS

| | | | | |
|---|---|---|---|---|
| 5,584,646 | A * | 12/1996 | Lewis | B66C 1/68 |
| | | | | 180/211 |
| 6,065,621 | A * | 5/2000 | Fatemi | B66C 23/48 |
| | | | | 212/264 |
| 6,129,226 | A * | 10/2000 | Donovan | B66C 23/54 |
| | | | | 212/238 |
| 9,717,934 | B2 * | 8/2017 | Vetesnik | A62B 35/04 |
| 9,744,386 | B2 * | 8/2017 | Baughman | F16M 11/42 |
| 2009/0134107 | A1 * | 5/2009 | Doggett | B64G 4/00 |
| | | | | 212/239 |
| 2016/0271430 | A1 | 9/2016 | Baughman et al. | |
| 2017/0225018 | A1 * | 8/2017 | Palet | E04G 21/3204 |
| 2020/0229894 | A1 * | 7/2020 | Chang | F16M 11/42 |

* cited by examiner

PROTECTIVE DEVICE TO PREVENT PERSONS FROM FALLING

BACKGROUND OF THE INVENTION

Field of the Invention

The invention relates to a protective device to prevent persons from falling, comprising a standing base and an anchor mast system which is connected to the standing base and to the free upper end of which personal protective equipment PPE is fastened, wherein the anchor mast system has a lower standing portion, which is mounted in a receiving housing so as to be pivotable about a horizontally running pivot axis relative to the standing base, and wherein that a cantilever portion is provided on the standing portion, in its upper end region opposite the pivot axis, said cantilever portion being mounted on the standing portion so as to be rotatable about an axis of rotation relative to the standing portion and being connected at its free end, which is directed upward in its starting position, to the PPE at an anchor point.

Such protective devices to prevent falling are used wherever collective safety devices, such as a side guard, cannot be used, or catching devices, such as safety nets, appear to be inexpedient. For example, reference may be made here to US 2016/0271430 A1 which discloses an anchor mast system which is adjustable on an upwardly directed "extended" starting position into a collapsed transport position of its standing portion and of its cantilever portion for the purpose of transportation. For this adjustment, an adjustment mechanism is provided, by means of which different starting positions of the cantilever portion can be fixedly set depending on the available clearance height. The adjustment mechanism here can be formed in a purely manually operable manner or can be driven by means of an electric motor. In both cases, the extended starting position should always be set rigidly, and therefore, during use, said starting position cannot be changed irrespective of the load state of the protective device to prevent falling.

In the case of further known protective devices to prevent falling, use is made of crane-like securing devices which are provided with a mast system and a cantilever and in which what is referred to as personal protective equipment "PPE" is arranged at the outer or upper end region of the cantilever. Such a fall protection device is described in more detail, for example, on the Internet site www.combisafe.com of COMBISAFE Deutschland GmbH. In the case of a catch device in the form of PPE, a safety rope is wound up on a type of drum and can be brought into contact with a person with a type of hook. In the event of a fall or an abrupt loading on the safety rope, the drum is blocked, and therefore the safety rope cannot be unwound further from the drum. The safety rope connected to the person to be secured is therefore tightened, and therefore the person is secured against an imminent fall. If the safety rope is relieved of load again, the drum is then released again, and therefore the person being secured can move freely again.

The main field of use of systems of this type is primarily to be found in formwork construction for ceiling formworks.

Some of the anchor methods used are based on fastening the fastening point of the catch device PPE to a sufficiently dimensioned baseplate with a very low-lying anchor point. This method is inexpedient in so far as additional hazard sources arise by the securing ropes of the PPE lying on the ground. By means of the constant rubbing of the securing ropes, the latter can be damaged and accordingly have to be frequently replaced.

One of the currently most frequently used methods is based on fastening the PPE to a cantilever crane with a standing base and a type of anchor mast system in order to guide the securing rope from above up to the person to be correspondingly secured. This method has proven very expedient in practice.

The disadvantages of this system consist in that, in order to ensure the stability, core sleeves or plates have to be incorporated early on into the planning of the construction project. Furthermore, these components constitute a not inconsiderable cost factor. Since said components can no longer be removed from the supporting structure of the construction, structural engineers are rather skeptical of this method.

To this extent, the problem consists in providing an anchor mast system (a crane) which, irrespective of the construction planning and static structure, has sufficient stability (min 6 kN) and can be used in a mobile manner. Such an anchor mast system is associated with a number of problems. The stability is in a direct ratio with the base mass and position of the tilting point to the anchor height. An anchor height sought of 2.35 m or up to 2.50 m above the underlying surface with a base diameter of 3.00 m requires a considerable base mass (approx. 1150 kg) which would lead to the bearing load for ceiling formworks being exceeded. If the base mass were reduced to approx. 600 kg, the standing surface of the standing base would have to be increased at least to a diameter of approx. 5.00 m. A reduction in the anchor height leads to the loss of practicality and appears less expedient.

SUMMARY OF THE INVENTION

It is the aim of the invention to provide a protective device to prevent falling, comprising an anchor mast system which, at a maximum base mass of the standing base of 450 kg to 500 kg and a standing surface with a diameter of approx. 2.50 m, temporarily dynamically has a stability factor of 1.25 in the case of a horizontally acting load of 6 kN and at maximum of 9 kN.

Starting from the fact that, in customary work processes, no load which is to be secured acts on this system from the outside, a base with the abovementioned dimensions would be sufficient. Since, in the event of a fall of a person fastened with a PPE device to the anchor point, the horizontally acting force can rise, according to EN guidelines, to up to 6 kN and at maximum up to 9 kN, the basic conditions have to be changed with a mechanical system.

The main feature of said technical safety device according to the invention consists in that the anchor mast system has a movable and geometrically guided arm which is adjustable from an extended starting position above a critical load influencing variable (triggering force) into an "angled" safety position, and therefore the position of the anchor point to which the PPE is fastened is guided downward relative to the standing base and at the same time away from the tilting edge of the standing base.

This object is achieved according to the invention together with the features of the preamble of the independent claim in that a pivot drive is provided in the region of the receiving housing, in that a mechanical sensor is provided in the pivot drive or in the cantilever portion, said sensor, in the event of the load action on the anchor point of the PPE that is greater than a predetermined triggering force, acting directly or indirectly on the pivot drive and leading to the immediate activation thereof and triggering a safety function, by means of which the standing portion and the cantilever portion is adjusted from an extended, upwardly directed starting position into an angled safety position, in which the anchor point takes up a position adjusted downward relative to the standing base and at the same time away from the tilting edge of the standing base.

The basic geometry of said anchor mast system is held in position in its starting position by a pivot drive in the form of an intelligently locked spring assembly, wherein the spring assembly can be designed in a similar manner to a spring strut. In said starting position, the entire system consisting of anchor mast system and receiving housing is rotatable by 360° about a vertical axis of rotation. In the event of a person connected to the PPE falling with a low load action on the pivot drive or on the anchor point of the PPE below a predetermined triggering force, said extended state of the anchor mast system with its standing portion and its cantilever portion remains unchanged.

Load actions on the pivot drive or on the anchor point of the PPE that are greater than the triggering force, for example greater than 2 kN, are identified via a mechanical sensor which is integrated in the pivot drive or in the cantilever portion, acts directly or indirectly on the pivot drive and leads to the immediate activation thereof and therefore triggers a safety function.

When said safety function is activated, the anchor mast system with its receiving housing is immediately secured mechanically against rotation in relation to the standing base. The pivot drive with its spring assembly acts counter to the external action of force here and shifts the anchor mast system from its substantially vertically running neutral starting position into a safety position facing obliquely "rearwards" away from the tilting edge of the standing base and therefore, because of the system geometry, shifts the anchor point downward and at the same time away from the tilting edge. This operation can be activated mechanically and carried out in a controlled manner.

The use of said anchor mast system enables use to be made of all of the advantages of a PPE device guided at the top. No additional hazard points arise due to securing ropes lying on the ground. Depending on the length of the PPE used, the working region comprises a radius of 10 m. Damage to the securing ropes due to rubbing is prevented. Said anchor mast system is usable in a mobile and individual manner. No additional costs arise due to core sleeves to be positioned in advance in the region of the ground. The statics of supporting pillars are not affected. Consideration during construction planning can be omitted.

It is possible here for, for example, a secure stability moment of 1.25 in the event of a horizontal action of load of 6 kN in the region of the anchor point or of 2.0 in the case of a securing load of 3 kN to be guaranteed. To this extent, the operating principle of the anchor mast system according to the invention substantially increases the stability after the triggering by activation of the pivot drive since the anchor point is guided downward and away from the tilting edge of the standing base. The distance of the anchor point from the underlying surface is thus in particular reduced, and therefore the horizontal forces acting on the anchor point produce a considerably smaller tilting moment.

Further advantageous refinements of the invention, in particular with regard to the construction and the function of the pivot drive, can be gathered from the further dependent claims.

Thus, according to a feature of the invention, it can be provided that the pivot drive is designed in the manner of a spring strut and has a compressed spring which is arranged between two spring plates, is under pretension in the starting position of the pivot drive and, when the pivot drive is activated, can be relaxed by means of a mechanical release device. The refinement permits a simple and effectively acting construction of the pivot drive.

Furthermore, it can be provided according to another feature of the invention that the first spring plate is arranged fixedly in an end region of a working cylinder, and that the second spring plate is arranged fixedly at the end of a piston rod, and that the piston rod is accommodated in the working cylinder so as to be axially adjustable to a limited extent and has a guide piston in its end region opposite the second spring plate.

The refinement according to the invention relates to the operating principle of the mechanical triggering or activation of the pivot drive. According thereto, it can be provided that the working cylinder, in its end region opposite the second spring plate, has a closure in which a fixing spike is arranged, said fixing spike projecting into the working cylinder and having an encircling groove in its end region projecting into the working cylinder, and that the piston rod, in its end region lying toward the closure, has a latching ball which is arranged in an aperture of a cylinder wall of the piston rod and is held in the starting position of the pivot drive in the encircling groove of the fixing spike by a release sleeve, and that the release sleeve is displaceable relative to the piston rod by means of release pins into a position in which the latching ball is released by a stepped inner bore of the release sleeve and is adjustable radially outward, and therefore the form-fitting connection between the piston rod and the fixing spike is removed and the piston rod is pushed out of the working cylinder by the spring force of the spring and can be brought into its securing position.

Furthermore, for the release of the latching ball and therefore of the piston rod in the working cylinder, a triggering cylinder is arranged in an axially adjustable manner on the fixing spike, and a monitoring chamber filled with hydraulic medium is provided in that end region of said triggering cylinder which is adjacent to the fixing spike, and that the hydraulic medium can escape from the monitoring chamber via a pressure-limiting valve in order to reduce pressure and, as a result, the triggering cylinder is adjustable in an adjusting direction and the release pins are adjusted together with the release sleeve into the release position in order to release the latching ball.

In order to damp the movement of the adjusting movement of the piston rod from its starting position into its end position, the piston rod can be provided with overflow channels in its end region adjacent to the release sleeve. The overflow channels leads from a damping chamber, which lies between the piston rod and the working cylinder and is filled with hydraulic medium, to a receiving space lying between the closure and the guide piston within the working cylinder, and through which overflow channels, during the adjustment of the piston rod from its starting position into its extended end position, hydraulic medium flows in order to damp the movement.

In a further variant embodiment, the pivot drive can likewise be designed in the manner of a spring strut and have a compressed spring of a spring assembly, said spring being arranged between two spring plates and being under prestress in the starting position of the pivot drive and, when the pivot drive is activated, being able to be relaxed by means of a release device, that a hydraulic cylinder with a pressure space is provided in the region of the spring assembly, the piston rod of which hydraulic cylinder is held in a shortened starting position of the hydraulic cylinder when a predetermined system pressure is present in the pressure space.

For this purpose, it can furthermore be provided that the release device has a triggering mechanism with an arrester slide, and that the arrester slide is arranged so as to be axially adjustable to a limited extent in the cantilever portion and, in the event of an action of force which is greater than a predetermined triggering force, can be brought from a starting position into a securing position, and that, by means of the adjusting movement of the arrester slide, a safety valve is actuable, by means of the adjustment of which from a closed blocking position into an open passage position, the system pressure in the pressure space of the hydraulic cylinder is dissipated in order to trigger the safety function of the pivot drive.

In said second variant embodiment of the pivot drive, the hydraulic cylinder which is integrated in the pivot drive can be used for pretensioning the spring assembly. Accordingly, it can be provided that for the resetting of the pivot drive from the triggered safety position into the shortened starting position, a hydraulic pump is provided for generating the system pressure, and that the system pressure can be supplied to the hydraulic cylinder of the pivot drive via a pressure line and via the piston rod and, when the predetermined system pressure is reached in the pressure space, an adjustment of the piston rod in the hydraulic cylinder is brought about counter to the spring force of the force assembly.

BRIEF DESCRIPTION OF THE SEVERAL VIEWS OF THE DRAWING

The invention will be explained in more detail below with reference to the drawings, in which.

DESCRIPTION OF THE INVENTION

Figure 1:
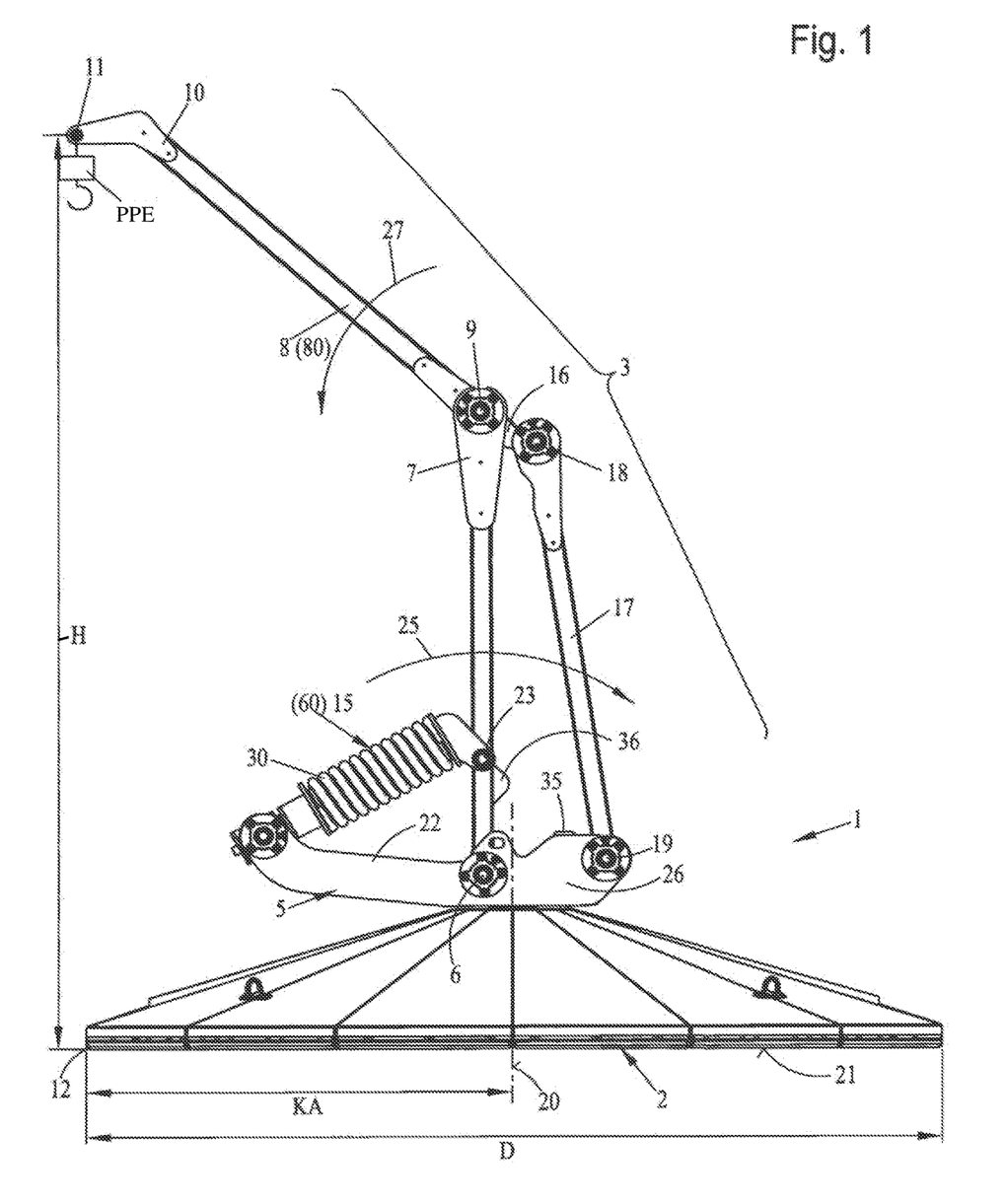
FIG. 1 shows a side view of a protective device to prevent falling, comprising a standing base and an anchor mast system, in its extended starting position.

FIG. 1 shows a side view of a protective device to prevent falling 1 according to the invention which has a standing base 2 and an anchor mast system 3. In the exemplary embodiment illustrated, the diameter D of the standing base 2 is approximately 2.5 m. Furthermore, it can be seen from FIG. 1 that a receiving housing 5 is arranged on the standing base 2, said receiving housing being mounted on the standing base 2 so as to be rotatable about the vertical axis of rotation 20 when the pivot drive 15 or 60 is not triggered. On the upper side, the receiving housing 5 has the anchor mast system 3 which is illustrated in FIG. 1 in its upwardly directed, extended starting position and consists of a standing portion 4, which is mounted on the receiving housing 5 so as to be pivotable about a pivot axis 6 of the receiving housing 5, and of a cantilever portion 8. The cantilever portion 8 is mounted on the standing portion 4, in the end region thereof opposite the pivot axis 6, so as to be rotatable about an axis of rotation 9. In its end region 10 lying axially opposite the axis of rotation, the cantilever portion forms an anchor point 11 with which "personal protective equipment" (PPE), merely illustrated schematically in FIG. 1, can be fixedly anchored. Therefore, during normal operation, the forces applied by a person act in the anchor point 11 and, in the event of an abrupt loading of the PPE, bring about blocking of the safety rope of the PPE such that a person connected to the PPE is secured. In principle, said PPE acts in its operating principle similarly to a safety belt as is known in motor vehicles.

Figure 2:
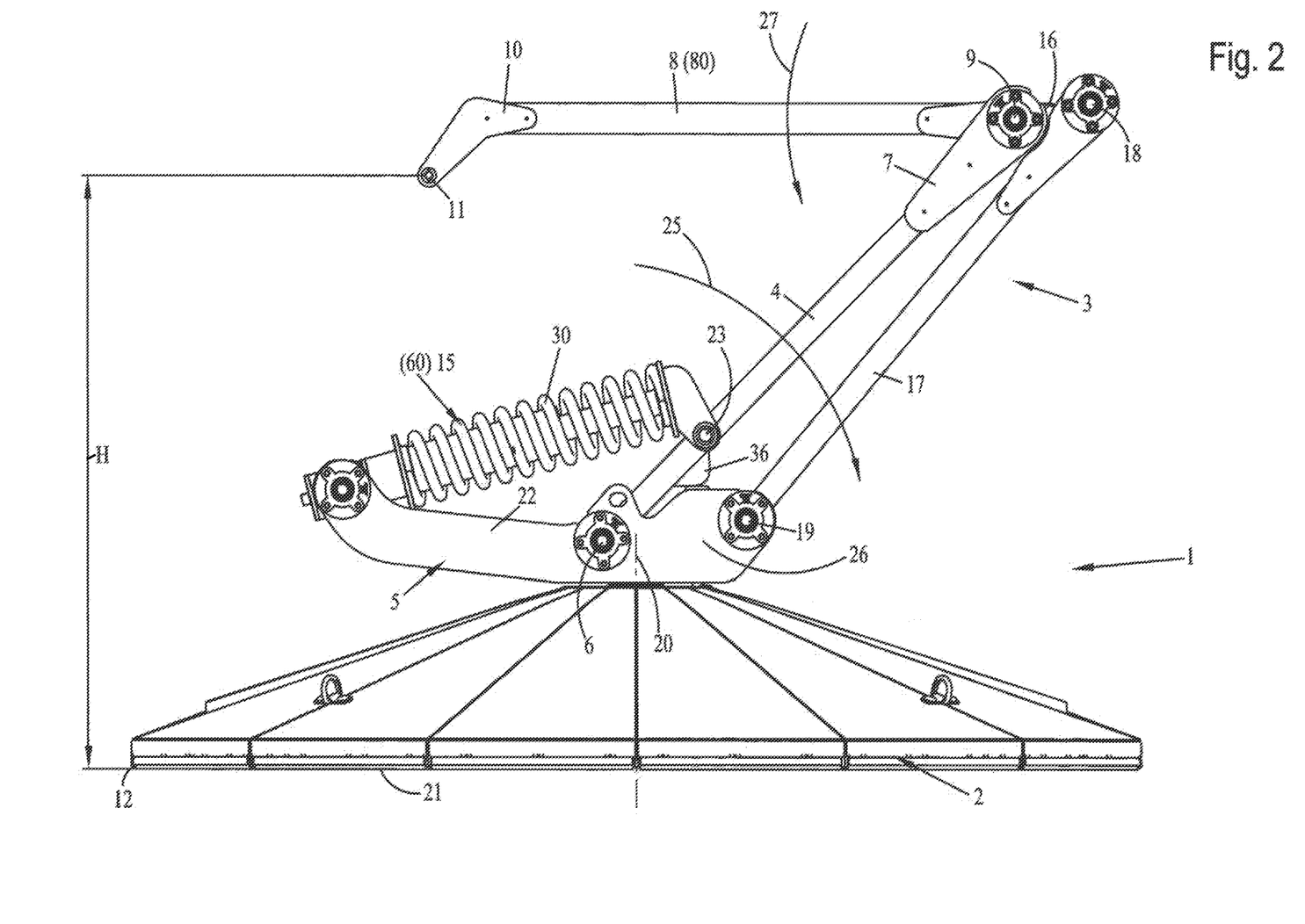
FIG. 2 shows the protective device to prevent falling from FIG. 1 in its activated securing position of the anchor mast system.
Figure 3:
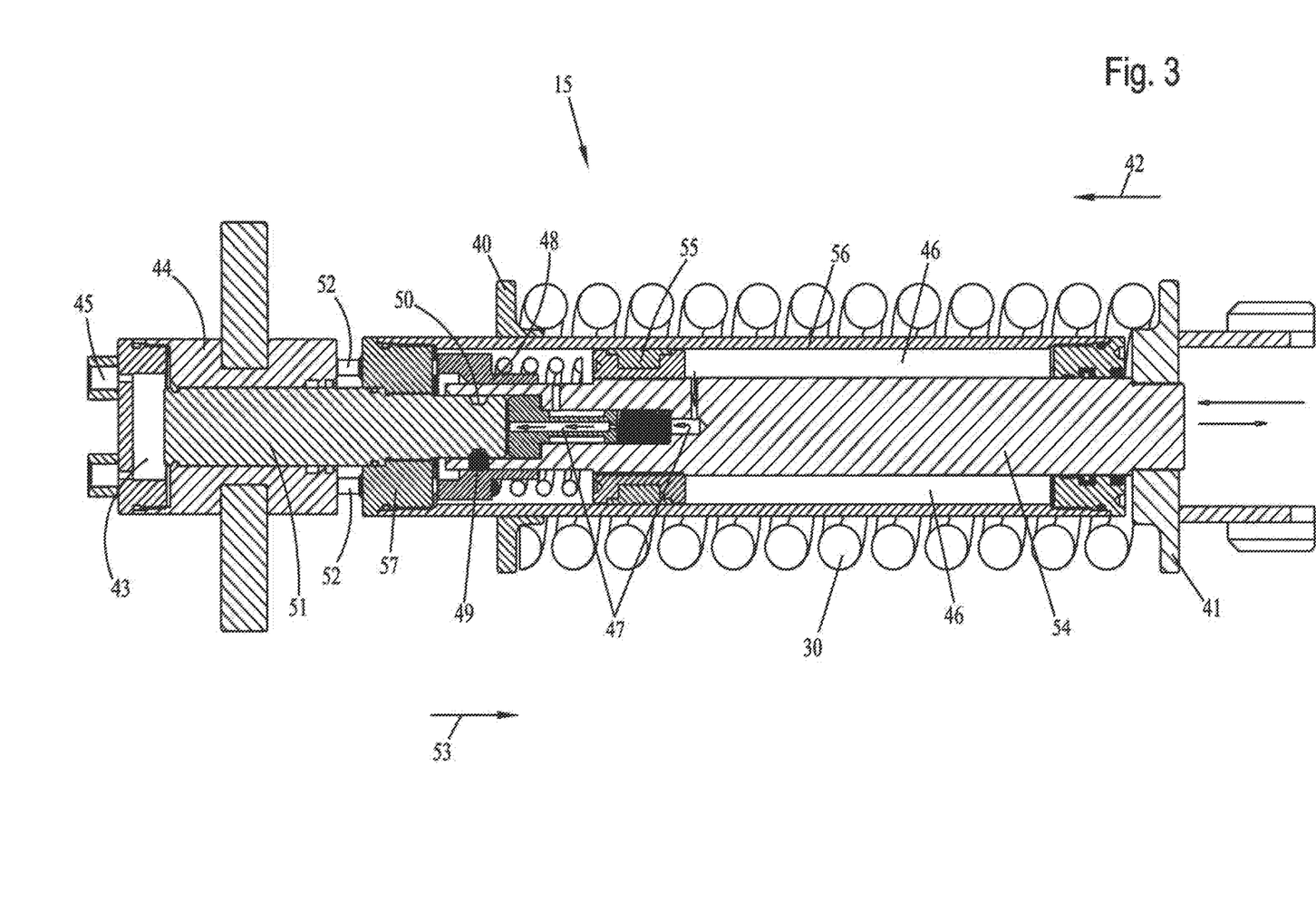
FIG. 3 shows a pivot drive in the form of a spring assembly in its inactive, shortened starting position.
Figure 4:
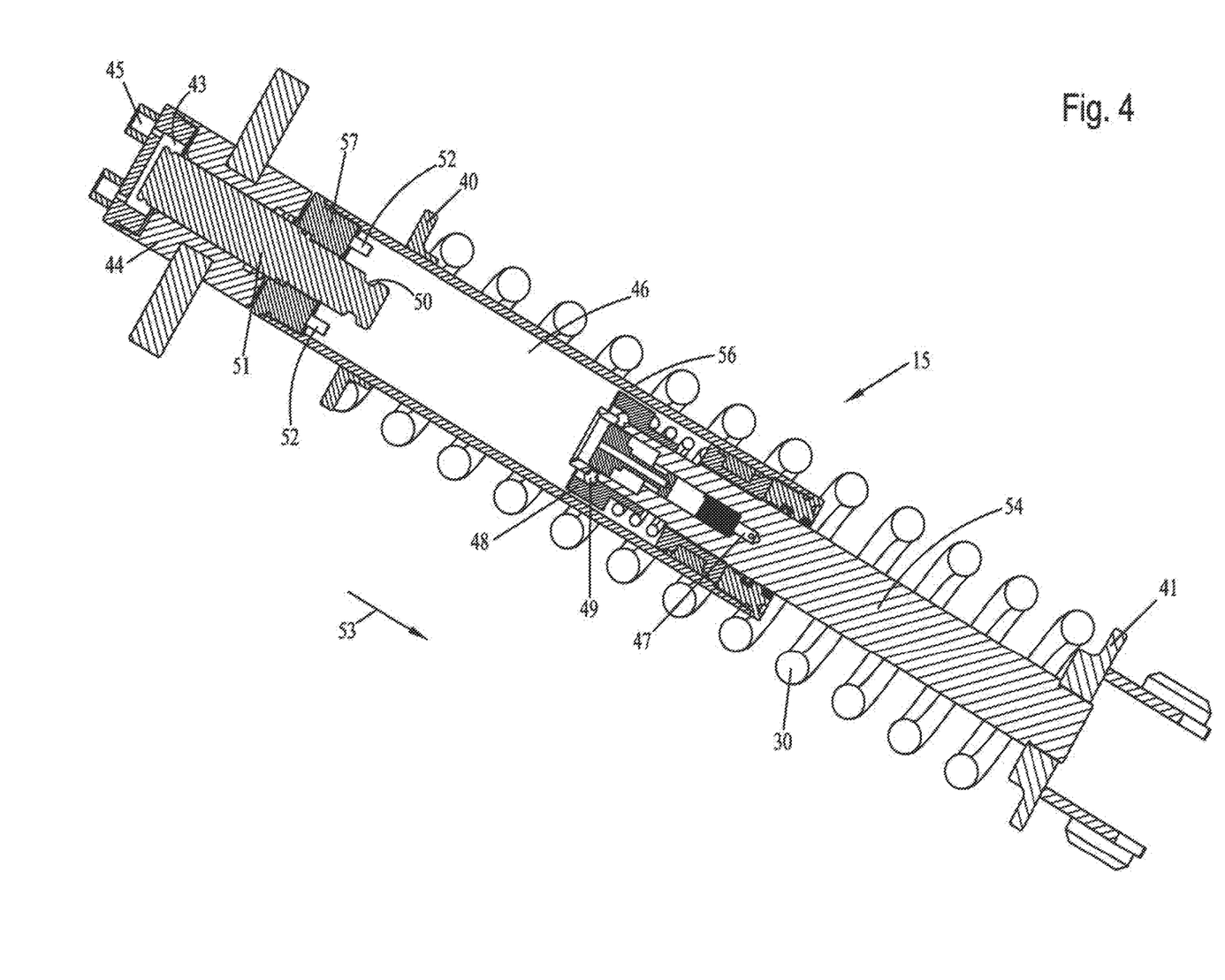
FIG. 4 shows the pivot drive from FIG. 3 in its "extended" active securing position.
Figure 5:
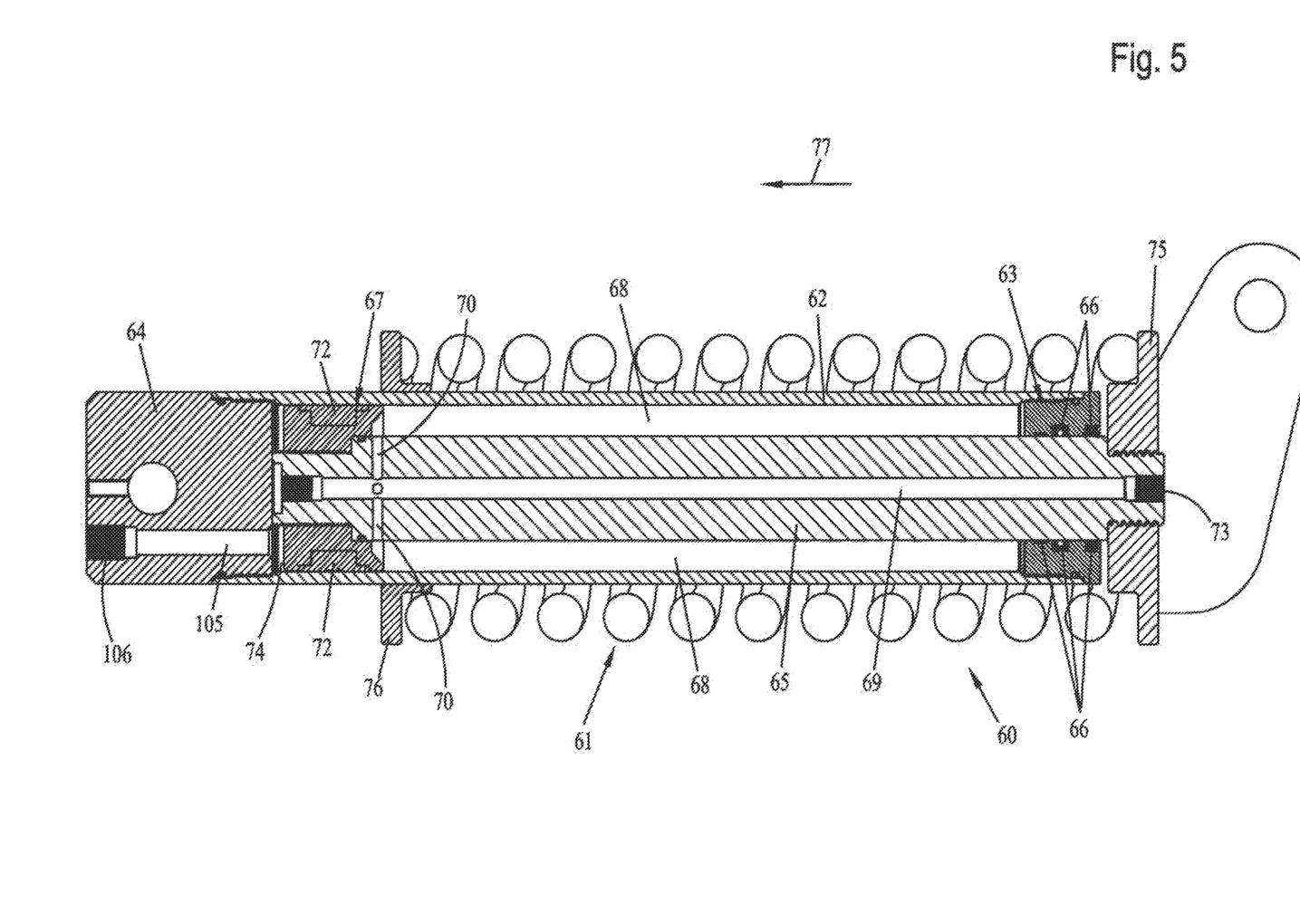
FIG. 5 shows a sectional illustration of a second variant embodiment of a pivot drive in its inactive, shortened starting position, in which the spring assembly of the pivot drive is under pretension.
Figure 6:
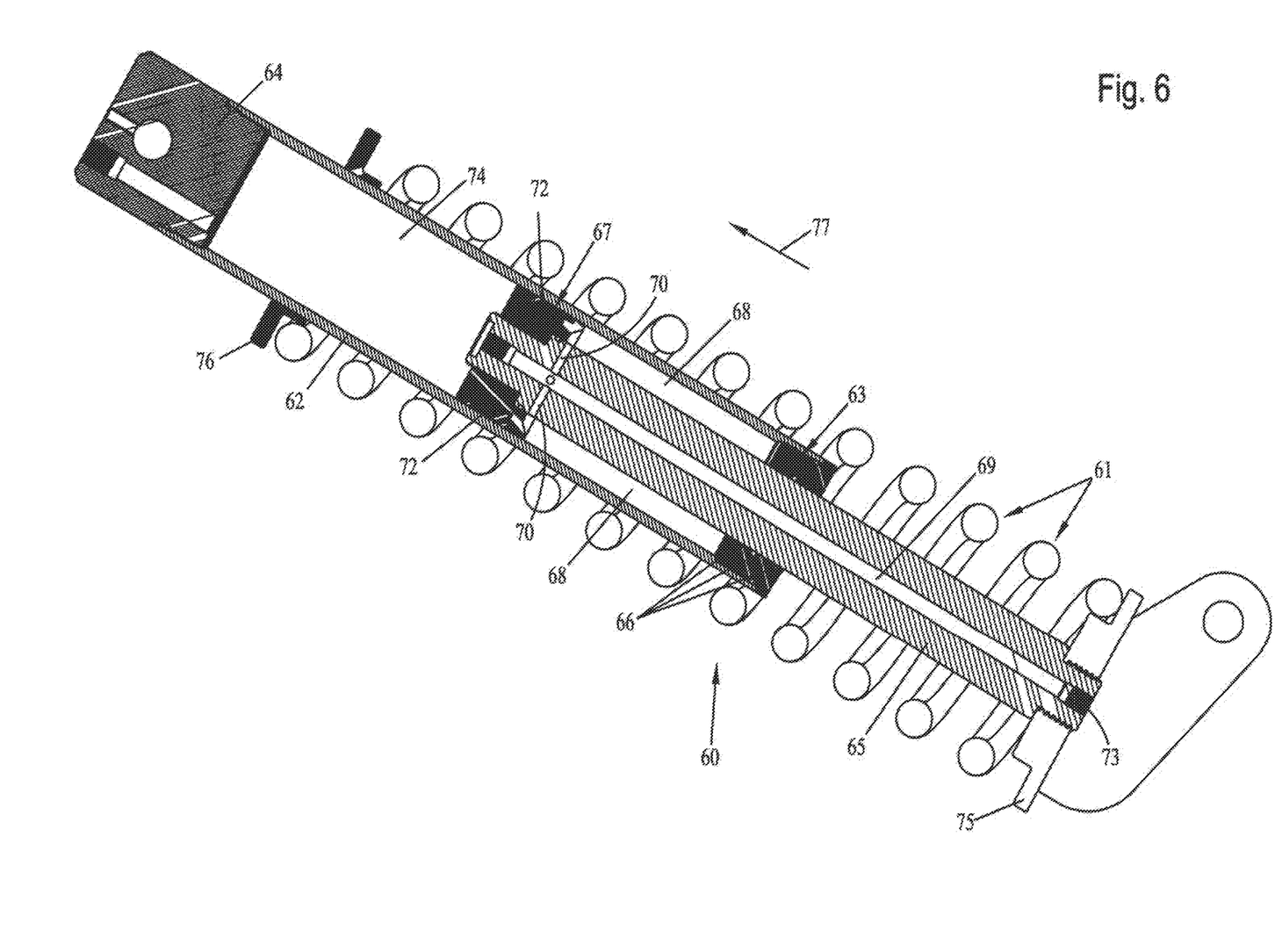
FIG. 6 shows the sectional illustration of the pivot drive from FIG. 5, in which the pivot drive is in its "extended" active securing position.

It can furthermore be seen from FIG. 1 that the receiving housing 5 has a pivot drive which is identified by the reference signs 15 and 60 in FIGS. 1 and 2, since there are two different variant embodiments for said pivot drive, of which a first variant embodiment of the pivot drive 15 is illustrated and described in FIGS. 3 and 4 and a second variant embodiment of the pivot drive 60 is illustrated and described in FIGS. 5 and 6.

Said pivot drive 15, 60 is arranged between a supporting arm 22 and the standing portion 4. In the position illustrated in FIG. 1, said pivot drive 15, 60 is in a shortened starting position, in which the standing portion 4 is fixed in the starting position illustrated in FIG. 1. Said shortened starting position of the first variant embodiment of the pivot drive 15 is also illustrated in FIG. 3. The shortened starting position of the second variant embodiment of the pivot drive 60 is illustrated in FIG. 5. In said starting position, the height H of the anchor point 11 above the standing surface 21 of the standing base 2 is approximately 2.5 m.

The base mass of the standing base 2 is 450 kg (4.5 kN) including the construction. The distance KA from the central, vertical axis of rotation to the "front" tilting edge 12 of the standing base 2 is 1250 mm in the present exemplary embodiment. In this configuration, a stability calculation can be omitted because of the in-built safety system. The stability is determined by practical loading tests and serves for defining the triggering force for activating the securing function. The value which is determined determines the activation of the safety function with a safety factor of 1.25. The triggering force is introduced here into the anchor mast system in the anchor point 11 and acts on the pivot drive via the bearing point between the pivot drive 15 and the standing portion 4.

Furthermore, it can be seen from FIG. 1 that the cantilever portion 8 in an approximately rectilinear extension with respect to the axis of rotation 9 has an adjusting lever 16 which is connected in an articulated manner to a slide rod 17 via a joint 18. The slide rod 17 is rotatably connected at an end region axially opposite the joint 18 via a further rotary joint 19 to a rear supporting lever 26 of the receiving housing 5. The distance between the pivot axis 6 and the rotary joint 19 is selected to be greater here than the distance between the axis of rotation 9 and the joint 18.

This geometrical design causes the acting load in the event of a fall to be transmitted from the upper anchor point to the bearing point 23. If a fixedly defined triggering value of the load is exceeded here, this leads to the triggering of the safety function or of the pivot drive 15. By means of the activation, the anchor mast is secured against rotation and folded up by means of a pretensioned spring 30 or spring assembly 30 of the pivot drive 15, as will be explained in more detail later. Such a spring assembly is also present in the second variant embodiment of the pivot drive 60 and is identified by the reference sign 61 in FIGS. 5 and 6. In the first variant embodiment of the pivot drive 15, a load transmission to the bearing point 23 is required in order to trigger the safety function, since a mechanical sensor in the form of a monitoring chamber 43 from FIGS. 3 and 4 brings about the triggering of the safety function via said bearing point.

Figure 7:
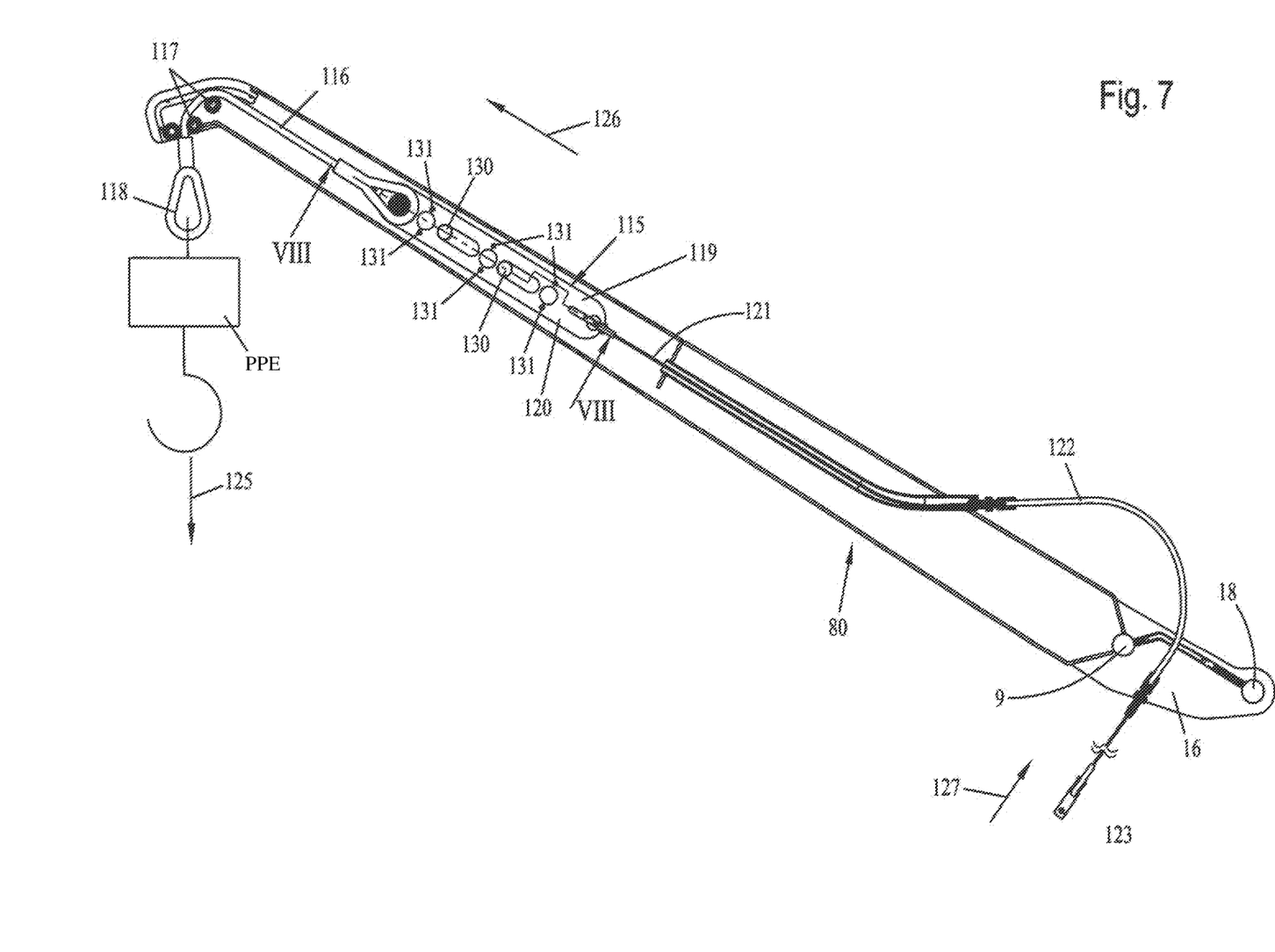
FIG. 7 shows a sectional illustration of a cantilever portion with an integrated mechanical sensor which is provided for triggering or for activating the pivot drive from FIGS. 5 and 6.

In the second variant embodiment of the pivot drive 60, another type of mechanical sensor, which will be explained in more detail further on with respect to FIG. 7, is provided in the cantilever portion 80. The cantilever portion 80 from FIG. 7 corresponds here to the cantilever portion 8 from FIGS. 1 and 2.

When the safety function is triggered, the standing portion 4 is pivoted both with respect to the pivot drive 15 and the pivot drive 60 by the pivot drive 15 or 60 in the direction of the arrow 25 to the "rear" via the bearing point. During said pivoting movement, the cantilever portion 8 or 80, which is coupled rotatably at the upper end, is rotated about the axis of rotation 9 in the direction of the arrow 27 because of its operative connection to the rear supporting lever 26 via the adjusting lever 16 and the slide rod 17. The anchor point 11 of the cantilever portion 8 or 80 is therefore simultaneously moved downward and away from the front tilting edge 12 of the standing base 2.

This position is shown by way of example in FIG. 2. It can be seen that the anchor point 11 has moved downwards and to the right, i.e. away from the front tilting edge 12 of the standing base 2, because of the pivoting movement of the standing portion 4 and the rotational movement of the cantilever portion 8 or 80. By means of the adjustment of the anchor point 11 in particular also relative to the standing surface 21 of the standing base 2, the height H of the anchor point 11 with respect to the underlying surface, on which the standing surface 21 of the standing base 2 is erected, is inevitably also reduced.

On account of said reduced height H of the anchor point 11 above the standing surface 21 of the standing base 2, the tilting moment acting on the entire protective device to prevent falling 1 is inevitably also considerably reduced. The shifting of the action point or of the anchor point 11 preferably takes place here in a damped manner and within a certain time window of 0.5 to 1.0 sec. This damping can be achieved here by a damping module integrated in the pivot drive 15 or by a damper connected parallel to the pivot drive 15 or 60.

The safety module of a first variant embodiment of the pivot drive 15 illustrated in more detail in FIGS. 3 and 4 will be explained in more detail below. A second variant embodiment of the pivot drive 60 is described with respect to FIGS. 5 and 6 which both carry out the same task. Said safety module or the pivot drive 15 or 60 forms the core element of the protective device to prevent falling 1 with its movable, i.e. collapsible, anchor mast system 3. The basic task of the safety module or of the pivot drive 15 or 60 firstly consists in holding the anchor mast system 3 with its standing portion 4 and its cantilever portion 8 or 80 in its starting position, which is illustrated in FIG. 1.

Furthermore, the force increasing in the direction of the tilting edge 12 in the event of a person secured by PPE is intended to be identified.

If the triggering force is exceeded, the safety module or the pivot drive 15 or 60 is intended to be immediately unlocked and the anchor mast system 3 is intended to be pushed into its securing position, as is illustrated in FIG. 2, by the spring action of the pivot drive 15 or 60.

Furthermore, when the pivot drive 15 or 60 is triggered, the rotation function of the receiving housing 5 in relation to the standing base can also be cancelled by means of a mechanical locking. Said mechanical locking can take place, for example, by a securing bolt 35 which can be actuated by the standing portion 4, which is adjusted into the securing position, as can be gathered in particular from FIGS. 1 and 2. For this purpose, an adjusting element 36 can be provided on the standing portion 4.

The operating principle of the "mechanical" unlocking of the pivot drive 15 will be explained briefly below with reference to FIGS. 3 and 4. In FIG. 3, the pivot drive 15 is in its non-triggered, shortened starting position. In said starting position, the pivot drive 15 is "compressed", and therefore the spring 30 thereof is accommodated under pretension between two spring plates 40 and 41.

By means of an increase of the force in the loading direction of the arrow 42, the pressure in the oil-filled monitoring chamber 43 of the triggering cylinder 44 is increased. The triggering cylinder 44 maintains its position here for as long as the loading, i.e. the oil pressure in the triggering cylinder 44, reaches the triggering point. If said pressure loading is reached, the piston rod 54 is displaced with its guide piston 55 in the direction of the arrow 53, and therefore the receiving space in the working cylinder 56, which receiving space can be seen between the guide piston 55 and the closure 57 of the working cylinder 56 and is not denoted specifically in the drawing, is enlarged.

Hydraulic medium flows here out of a damping chamber 46, which is formed between the piston rod 54 and the working cylinder 59, via overflow channels 47 arranged in the piston rod 56 into the region of one of said receiving spaces.

In the starting position illustrated in FIG. 3, when the abovementioned loading is reached, a latching ball 49 arranged in an aperture of a cylinder wall at the end of the piston rod 54 is kept in engagement with an encircling groove 50 of a fixing spike 51 by a relief sleeve 48, which is arranged on the piston rod 54, via a stepped inner bore (not denoted specifically in the drawing) of the relief sleeve 48.

When the triggering point is reached, the supporting hydraulic medium of the monitoring chamber 43 escapes via a connected pressure-limiting valve 45, and therefore the pressure within the monitoring chamber 43 decreases as far as a "limit pressure" predetermined by the pressure-limiting valve 45 such that, during this operation, the triggering cylinder 44 is now likewise adjusted to the right in the direction of the arrow 53 counter to the release pins 52 and the release sleeve 48.

By means of the displacement of the release sleeve 48 with its inner bore into a region of larger diameter, the latching ball 49 can now migrate radially outward into said region of the enlarged inner bore, and therefore the form-fitting connection of the latching ball 49 with the encircling groove 50 of the fixing spike 51 is removed. After removal of said "latching connection", the piston rod 54 is then released, and therefore the piston rod 54 together with the spring plate 41 moves in the direction of the arrow 43 from the position illustrated in FIG. 3 into the triggered, active position illustrated in FIG. 4. The piston rod 54 is guided here via a guide piston 55 in the working cylinder 56 of the pivot drive 15.

The pivot drive 15 is therefore triggered by axial loading of the pivot drive 15 in the direction of the arrow 42. When a predetermined axial force is reached, the release pins 52 are "pushed" to the right in the direction of the arrow 53 into the left closure 57 of the working cylinder 56, as a result of which the above-described axial adjustment of the release sleeve 48 is brought about.

By means of the adjustment of the release sleeve 48 in the direction of the arrow 53, the latching ball 49 is released and can move radially outward. This removes the locking action of the latching ball 49 between the piston rod 54 and the inner part of the fixing spike 51, and therefore the piston rod 54 together with the spring plate 41 can be adjusted to the right by the spring force of the spring 30 and thus the anchor mast system 3 is brought from the starting position illustrated in FIG. 1 into the securing position illustrated in FIG. 2.

Via the shifting of the anchor point of the PPE with a deadweight of 450 kg, the protective device to prevent falling according to the invention manages to protect a weight of 750 kg. By means of the physical force of the lever action and most recent safety technology, it provides the optimum protection during work at every height position. With an overall weight of a mere 450 kg, it provides mobile protection during work on the construction site. It can always be safely transported to its installation site with the aid of a hand pallet truck. Intuitive handling permits rapid and safe work for the user. This means that the protective device to prevent falling according to the invention only needs to be hoisted at its installation site once with the crane and then permits independent operation. An overhead anchoring and a ball-mounted housing ensure the optimum action radius during the work.

Furthermore, FIGS. 5 and 6 show a second possibility of refining a pivot drive 60 which likewise has a type of spring assembly 61 in the form of a spring. FIG. 5 illustrates the pivot drive 60 in its shortened starting position, in which the anchor mast system 3 is held with its standing portion 4 and its cantilever portion 8 or 80 in the starting position illustrated in FIG. 1. It can be seen here from FIGS. 5 and 6 that the pivot drive 60 has a central hydraulic cylinder 62 which is closed on one side by a hydraulic cover 63 on the right side of the drawing and on the other side by a hydraulic cover 64 on the left side. The right hydraulic cover 63 here is of annular design and has a central piston rod 65 protruding therethrough in an axially displaceable manner. For the hydraulic sealing of the piston rod 65 in relation to the hydraulic cover 63, a multi-part sealing arrangement is provided which is indicated overall by the reference sign 66. On the axially opposite side of the piston rod 65, the latter is provided with an annular piston 67 which is sealed in an axially adjustable manner in relation to the hydraulic cylinder 62 via a further sealing arrangement 72.

It can be seen that a pressure space 68 which is delimited radially to the outside by the hydraulic cylinder 62 and radially to the inside by the piston rod 65, which is adjustable axially in the hydraulic cylinder 62, is formed in the axial direction between the annular piston 67 and the annular hydraulic cover 63. It can furthermore be seen that the piston rod 65 has a central longitudinal bore 69 which is provided in the right end region with a threaded connection 73 via which the longitudinal bore 69 is connected in terms of pressure to a hydraulic pressure line which can merely be seen schematically by the designation 100 in the circuit diagram of FIG. 9 and is not illustrated in FIGS. 5 and 6. Furthermore, it can be seen from FIGS. 5 and 6 that the piston rod 65 has, starting from its longitudinal bore 69 in the end region of its annular piston 67, two transverse bores 70 which run radially and via which the longitudinal bore 69 is connected to the pressure space 68. The pivot drive 60 is located with its piston rod 65 in its "extended" securing position which is illustrated in FIG. 6 and in which the anchor mast system 3 is in the safety pivot position illustrated in FIG. 2. In order now to bring the pivot drive 60 from the securing position illustrated in FIG. 6 into the shortened starting position illustrated in FIG. 5, the central longitudinal bore 69 together with the two transverse bores 70 are provided. It is easily conceivable for pressurized hydraulic medium to be able to be supplied to the pressure space 68 within the hydraulic cylinder 62 from a hydraulic pressure source, such as, for example, a hydraulic pump 101, illustrated schematically in FIG. 9, via the threaded connection 73, the longitudinal bore 69 and the two transverse bores 70. When the system pressure within the pressure space 68 is sufficient, the piston rod 62 can therefore move in the direction of the arrow 77 counter to the spring force of the spring assembly 61 such that the piston rod 62 and therefore the pivot drive can be brought in a simple manner out of the extended securing position of FIG. 6 back again into the starting position illustrated in FIG. 5. In order to maintain the system pressure in the pressure space 68, the hydraulic pump 101 can be provided, for example, with a nonreturn valve arrangement 103, as is illustrated schematically in the circuit diagram of FIG. 9.

During this "resetting movement" of the piston rod 62 together with its annular piston 67 in the direction of the arrow 77, the cavity 74 from FIG. 6, which is located between the annular piston 67 and the left hydraulic cover 64, is inevitably reduced into a type of annular space 74 as can be seen by way of indication in FIG. 5. In order to be able to allow the medium located in the cavity 74 to escape from the latter, the left hydraulic cover 64 is provided with a venting bore 105 which is connected via a "leakage connection" 106 to a "leakage oil line" 102, as schematically revealed in the circuit diagram of FIG. 9. Said leakage oil line 102 leads into a type of compensating container 107 (FIG. 9) which can also serve for supplying the hydraulic pump 101, which is illustrated schematically in the circuit diagram according to FIG. 9. The "leakage oil line" also serves for "pressure compensation" during the activation of the pivot drive 60 when the safety function is triggered, i.e. when the piston rod 65 moves from the starting position illustrated in FIG. 5 into the securing position illustrated in FIG. 6.

Figure 9:
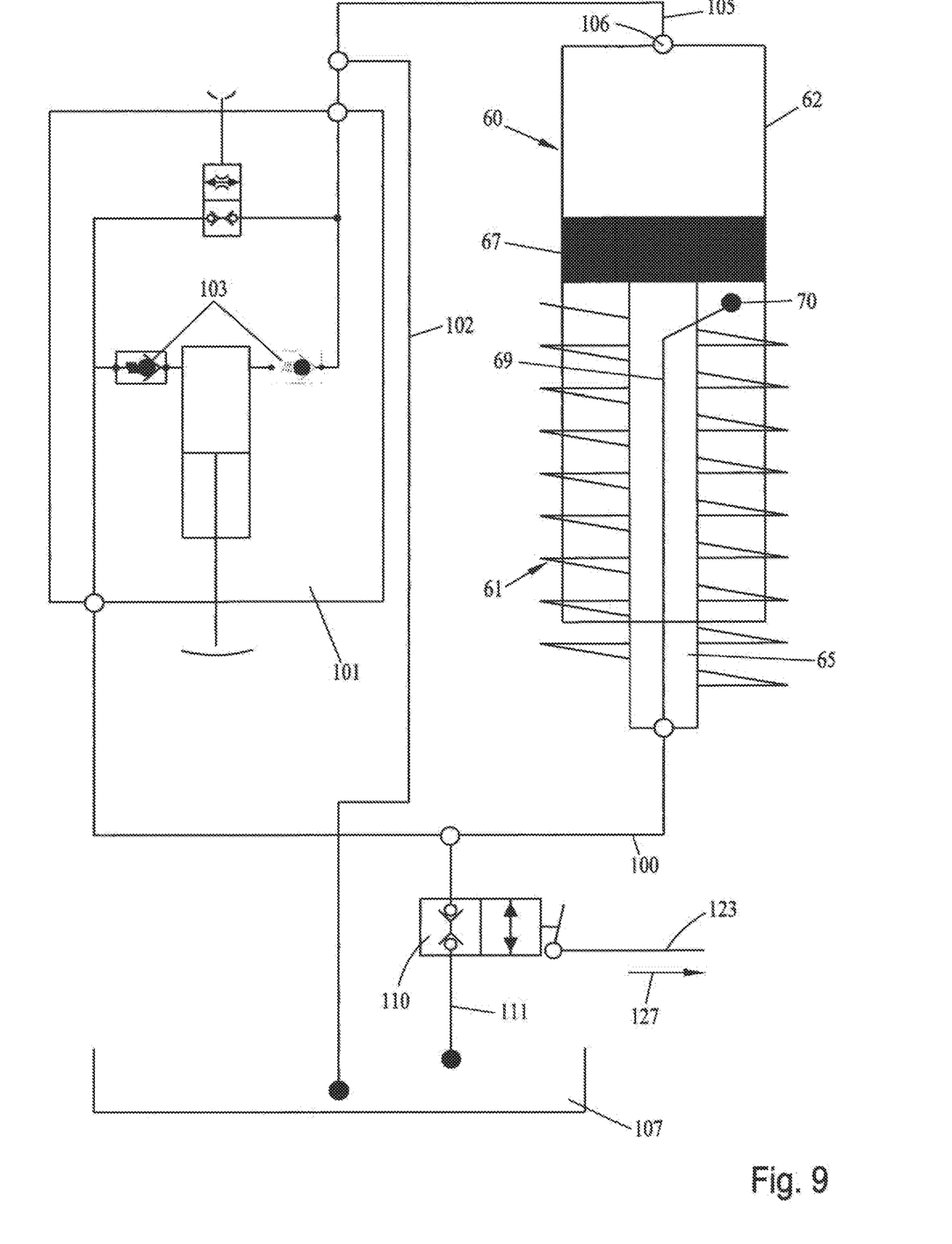
FIG. 9 shows a circuit diagram for the operation and the basic construction of the pivot drive from FIGS. 5 and 6 and of the integrated sensor from FIGS. 7 and 8.

In order to trigger the safety function and therefore to activate the pivot drive 60, a preferably mechanically switchable safety valve 110, which is likewise illustrated merely schematically in FIG. 9, is provided in the region of the pressure line 100. FIG. 9 illustrates the safety valve 110 in its closed blocking position, and therefore the system pressure which is in the pressure line 100 and is applied by the hydraulic pump 101 cannot "dissipate". If the safety valve 110 is brought into its open switching position, i.e. is adjusted "to the left" from the blocking position illustrated schematically in FIG. 9 into its open passage position, the pressure line 100 is "switched through" via a relief line 111 to the compensating container 107, as a result of which pressure relief in the pressure line 100 and therefore via the longitudinal bore 69 and the transverse bores 70 also is brought about a pressure relief in the pressure space 68 of the hydraulic cylinder 62.

Since the spring of the spring assembly 61 in the starting position according to FIG. 5 is accommodated under pretension between the two spring plates 75 and 76 firstly at the end of the piston rod 65 and secondly at the end of the hydraulic cylinder 62 in the starting position illustrated in FIG. 5, with the dissipation of the system pressure in the pressure space 68 of the hydraulic cylinder 62 the piston rod together with the spring plate 75 is moved out of the starting position of FIG. 5 into the securing position according to FIG. 6.

It can therefore be seen from FIGS. 5 and 6 that also in the case of the second variant embodiment of the pivot drive 60, a spring assembly 61 is provided with a spring which is accommodated under pretension between the spring plates 75 and 76 in the shortened starting position of the pivot drive 60 that is illustrated in FIG. 5. Said starting position is held by the system pressure within the pressure space 68 in the hydraulic cylinder 62. If the safety valve 110 is brought into its open position when a predetermined load on the PPE, which is fastened to the anchor point 11, of the anchor mast system 3, illustrated in FIG. 1, is reached, the safety function of the pivot drive 60 is triggered.

For the adjustment of the safety valve 110, in the case of the second variant embodiment of the pivot drive 60, a cantilever portion 80 is provided which is illustrated in FIG. 7 and is provided with a special triggering mechanism 115. The cantilever portion 80 from FIG. 7 should be used here in the same manner as the cantilever portion 8 from FIGS. 1 and 2, and therefore the two reference signs 8 and 80 are also used for the cantilever portion in FIGS. 1 and 2.

As can be seen from FIG. 7, the triggering mechanism 115 is connected to an arrester cable 116 which is guided out of the cantilever portion 80 on the front side via deflecting pulleys 117. A type of carabiner hook 118, for example, can be arranged at the outer end of the arrester cable 116, or at the end thereof emerging downward out of the cantilever portion 80, via which carabiner hook, in turn, the PPE is fastened to the arrester cable 116. The arrester cable 116 is connected in tension to an arrester slide 119 of the triggering mechanism 115. Furthermore, it can be seen from FIG. 7 that the arrester slide 119 is connected in tension at its end 120 opposite the arrester cable to a tension cable 121 of a Bowden cable 122. The tension portion 123 emerging at the "rear" end of the Bowden cable 122 is connected in turn to the safety valve 110, as can be seen schematically from FIG. 9. If a load now acts on the PPE and therefore on the arrester cable 116 in the direction of the arrow 67, said load being greater than a predetermined triggering force, the arrester slide is adjusted in the direction of the arrow 126. This at the same time brings about an adjustment of the tension cable 121 in the same direction. On the basis of the connection of the tension cable 121 by its tension portion 123 to the safety valve from FIG. 9, an adjusting movement of the safety valve is brought about in the direction of the arrow 127, as a result of which the safety valve from FIG. 9 passes into its open position. The safety function of the pivot drive 60 is therefore triggered and the anchor mast system 3 moves out of the "upright" starting position illustrated in FIG. 1 into the angled securing position illustrated in FIG. 2.

Figure 8:
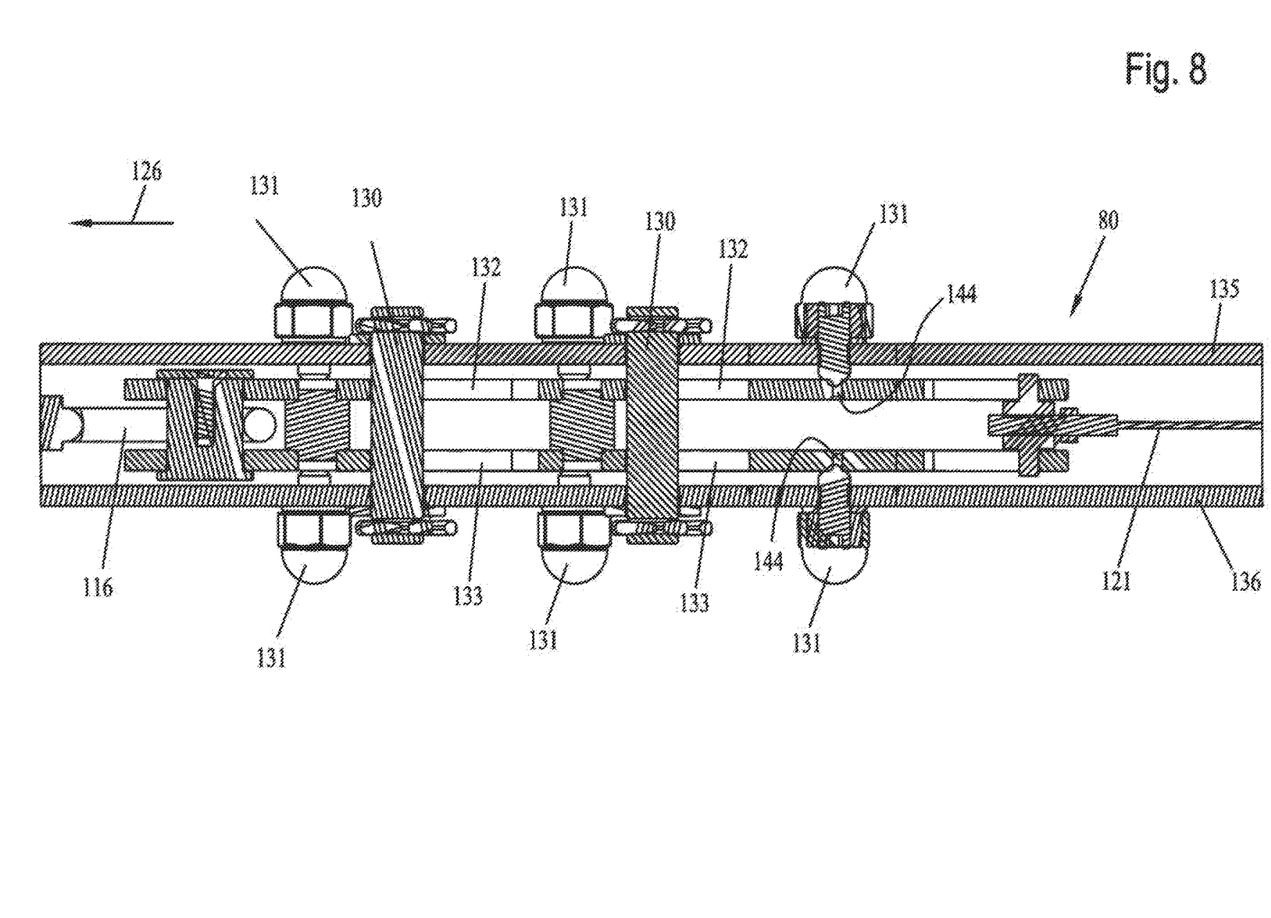
FIG. 8 shows a horizontal section VIII-VIII through the sensor which is arranged integrated in the cantilever portion from FIG. 7 and is designed in the form of an "arrester slide"

In order to trigger the arrester slide 119 when a predetermined "limit load" is exceeded, said arrester slide can have a special configuration which is illustrated by way of example in the sectional illustration of FIG. 8. It can be seen from FIGS. 7 and 8 that the arrester slide 119 is mounted so as to be displaceable to a limited extent in the direction of the arrow 126 by means of two guide bolts 130 in the cantilever portion 80. As is apparent from FIG. 8, the two guide bolts 130 project through the two side walls 135, 136 of the cantilever portion 80 and are secured captively on both sides. The guide studs 130 project here through two guide slots 132 and 133, which are limited in their axial length, in the side walls 140 or 141 of the arrester slide 119. Furthermore, it can be seen by way of indication from FIG. 7 that the guide slide 119 has a total of six latching studs 131, the configuration of which is illustrated in more detail in FIG. 8 for the two right latching studs 131. It can be seen that, in the starting position of the arrester slide 119 that is illustrated in FIG. 8, the latching studs each engage in a spring-loaded manner in bores of the side walls 140, 141 of the arrester slide 119.

In said latched position, the entire arrester slide 119 is held in the starting position illustrated in FIGS. 7 and 8. If the arrester slide is then loaded via the arrester cable 116 with axial forces in the direction of the arrow 126, said axial forces lying above a predetermined load of, for example, 2 kN, the latching studs 131 are released from the associated bores 144, and therefore the entire arrester slide 119 can move to a limited extent with the guide slots 132, 133 along the guide studs 130. By means of said adjusting movement, the tension cable 121 in the Bowden cable 122 and therefore also the tension portion 123 projecting out of the Bowden cable 122 is simultaneously also adjusted. Since the tension portion 123 is operatively connected to the safety valve 110 from FIG. 9, the safety valve 110 is also brought by said adjusting movement from its blocking position illustrated in FIG. 9 into an open position displaced to the left. The "relief line" 111 from FIG. 9 is therefore switched through by the pressure line 100 into the compensating container 107, and therefore the system pressure built up in the pressure line 100 and the pressure space 68 of the hydraulic cylinder 62 can escape and inevitably leads to the "unlocking" of the pivot drive 60 for triggering the safety function.

It can be seen that, by means of said functional relationship, illustrated by way of example, of the triggering mechanism 115 in conjunction with the hydraulic cylinder 62 and the safety valve 110, the triggering of the safety function of the pivot drive 60 can be brought about extremely reliably.

With said special configuration of the pivot drive 60 with its hydraulic cylinder 62 and the spring of the spring assembly 61 that is accommodated under pretension between the spring plates 75, 76 of the hydraulic cylinder 62 and the piston rod 65 in the starting position, after triggering of the safety function the spring assembly can also be reset again in a simple manner into the starting position. For this purpose, the hydraulic pump 101 which is illustrated schematically in FIG. 9 and is activated in order to generate a certain system pressure in the pressure space 68 of the hydraulic cylinder 62 is provided. By means of the nonreturn valve arrangement 103 of the hydraulic pump 101, the system pressure is also maintained, when the safety valve 110 is closed, until the safety valve 110 is opened for the triggering of the safety function. The safety function is triggered here by the actuation of the triggering mechanism 115 in the cantilever portion 80, said triggering mechanism acting directly or indirectly on the safety valve 110, as described above.

The invention claimed is:

1. A protective device to prevent persons from falling, the protective device comprising:
   a standing base having a tilting edge;
   a receiving housing;

an anchor mast system connected to said standing base and having a free upper end to which personal protective equipment is fastened, said anchor mast system having a lower standing portion, mounted in said receiving housing so as to be pivotable about a horizontally running pivot axis relative to said standing base;

said anchor mast system further having an anchor point and a cantilever portion provided on said standing portion, said cantilever portion having an upper end region opposite the horizontally running pivot axis, said cantilever portion being mounted on said standing portion so as to be rotatable about an axis of rotation relative to said standing portion and having a free end directed upward in a starting position, and connected to the personal protective equipment at said anchor point;

a pivot drive disposed in a region of said receiving housing; and a mechanical sensor disposed in said pivot drive or in said cantilever portion, said mechanical sensor, in an event of a load action on said anchor point for the personal protective equipment that is greater than a predetermined triggering force, acting directly or indirectly on said pivot drive and leading to an immediate activation thereof and triggering a safety function, by means of the safety function said standing portion and said cantilever portion are adjusted from an extended, upwardly directed said starting position into an angled safety position, in which said anchor point takes up a position adjusted downward relative to said standing base and at a same time away from said tilting edge of said standing base in a direction of said receiving housing.

2. The protective device to prevent falling according to claim 1, wherein said pivot drive is configured in a manner of a spring strut and has a mechanical release sleeve, two spring plates and a compressed spring which is disposed between said two spring plates, and is under pretension in a starting position of said pivot drive and, when said pivot drive is activated, can be relaxed by means of said mechanical release sleeve.

3. The protective device to prevent falling according to claim 2, wherein:
said pivot drive has a working cylinder and a piston rod;
said spring plates include a first spring plate that is disposed fixedly in an end region of said working cylinder, and a second spring plate that is disposed fixedly at an end of said piston rod; and
said piston rod is accommodated in said working cylinder so as to be axially adjustable to a limited extent and has a guide piston in an end region opposite said second spring plate.

4. The protective device to prevent falling according to claim 3, wherein:
said pivot drive has release pins, a fixing spike and a closure;
said working cylinder, in an end region opposite said second spring plate, has said fixing spike and said closure in which said fixing spike is disposed, said fixing spike projecting into said working cylinder and having an encircling groove formed therein in an end region projecting into said working cylinder; and
said piston rod has a cylinder wall with an aperture formed therein, said piston rod in an end region lying toward said closure, has a latching ball which is disposed in said aperture of said cylinder wall of said piston rod and is held in the starting position of said pivot drive in said encircling groove of said fixing spike by said mechanical release sleeve, and in that said mechanical release sleeve is displaceable relative to said piston rod by means of said release pins into a position in which said latching ball is released by a stepped inner bore of said mechanical release sleeve and is adjustable radially outward, and therefore a form-fitting connection between said piston rod and said fixing spike is removed and said piston rod is pushed out of said working cylinder by a spring force of said compressed spring and can be brought into a securing position.

5. The protective device to prevent falling according to claim 4, wherein said pivot drive includes:
a triggering cylinder disposed in an axially adjustable manner on said fixing spike and has an end region;
a pressure-limiting valve; and
a monitoring chamber filled with a hydraulic medium and disposed in said end region of said triggering cylinder which is adjacent to said fixing spike, and in that the hydraulic medium can escape from said monitoring chamber via said pressure-limiting valve in order to reduce pressure and, as a result, said triggering cylinder is adjustable in an adjusting direction and said release pins are adjusted together with said mechanical release sleeve into a release position in order to release said latching ball.

6. The protective device to prevent falling according to claim 4, wherein:
said pivot drive has a damping chamber which lies between said piston rod and said working cylinder and is filled with hydraulic medium; and
said piston rod has overflow channels in an end region adjacent to said mechanical release sleeve, said overflow channels being connected by said damping chamber to a receiving space lying between said closure and said guide piston within said working cylinder, and through said overflow channels, during an adjustment of said piston rod from the starting position into an extended end position, the hydraulic medium flows in a longitudinal direction in order to damp a movement.

7. The protective device to prevent falling according to claim 1,
further comprising a release device; and
wherein said pivot drive is configured as a spring strut, and has two spring plates, a hydraulic cylinder with a pressure space, a piston rod and a spring assembly with a compressed spring, said compressed spring being disposed between said two spring plates and being under prestress in a starting position of said pivot drive and, when said pivot drive is activated, being able to be relaxed by means of said release device, in that said hydraulic cylinder with said pressure space is disposed in a region of said spring assembly, said piston rod is held in a shortened starting position of said hydraulic cylinder when a predetermined system pressure is present in said pressure space of said hydraulic cylinder.

8. The protective device to prevent falling according to claim 7, wherein said release device has a safety valve and a triggering mechanism with an arrester slide, said arrester slide is disposed so as to be axially adjustable to a limited extent in said cantilever portion and, in an event of an action of force which is greater than the predetermined triggering force, can be brought from a starting position into a securing position, and in that, by means of an adjusting movement of said arrester slide, said safety valve is actuable, by means of an adjustment of which from a closed blocking position into an open passage position, a system pressure in said pressure space of said hydraulic cylinder is dissipated in order to trigger the safety function of said pivot drive.

9. The protective device to prevent falling according to claim 7,
  further comprising a pressure line;
  further comprising a hydraulic pump; and
  wherein for a resetting of said pivot drive from a triggered safety position into a shortened starting position, said hydraulic pump is provided for generating the predetermined system pressure, and in that the predetermined system pressure can be supplied to said hydraulic cylinder of said pivot drive via said pressure line and via said piston rod and, when the predetermined system pressure is reached in said pressure space, an adjustment of said piston rod in said hydraulic cylinder is brought about counter to a spring force of said spring assembly.

\* \* \* \* \*